(12) United States Patent
Lavezzi

(10) Patent No.: US 6,922,994 B1
(45) Date of Patent: Aug. 2, 2005

(54) HYDRAULIC PUMP FOR VEHICLES CONTROLLABLE BY HANDLEBARS

(75) Inventor: Roberto Lavezzi, Brembate Di Sopra (IT)

(73) Assignee: Freni Brembo S.p.A., Curno (IT)

( * ) Notice: Subject to any disclaimer, the term of this patent is extended or adjusted under 35 U.S.C. 154(b) by 11 days.

(21) Appl. No.: 10/381,304

(22) PCT Filed: Sep. 29, 2000

(86) PCT No.: PCT/IT00/00386

§ 371 (c)(1),
(2), (4) Date: Jun. 12, 2003

(87) PCT Pub. No.: WO02/28701

PCT Pub. Date: Apr. 11, 2002

(51) Int. Cl.[7] .................................. F15B 7/08
(52) U.S. Cl. ...................................... 60/588
(58) Field of Search ........... 60/533–594; 180/218–231

(56) References Cited

U.S. PATENT DOCUMENTS

| | | | | |
|---|---|---|---|---|
| 2,148,232 A | * | 2/1939 | Bowen | 60/588 |
| 2,539,572 A | * | 1/1951 | Dodge | 60/586 |
| 2,564,137 A | * | 8/1951 | Wahlberg | 60/588 |
| 3,802,200 A | * | 4/1974 | Kolm | 60/594 |
| 4,086,770 A | * | 5/1978 | Shaw | 60/562 |
| 4,200,163 A | * | 4/1980 | Bass et al. | 180/219 |
| 4,501,340 A | * | 2/1985 | Yoshida | 180/219 |
| 4,528,895 A | | 7/1985 | Nakamura | |
| 4,878,346 A | * | 11/1989 | Metzelfeld et al. | 60/588 |
| 5,020,326 A | | 6/1991 | Barker et al. | |

FOREIGN PATENT DOCUMENTS

| | | | |
|---|---|---|---|
| DE | 4423621 | 1/1996 | |
| EP | 435110 | 7/1991 | |
| GB | 1245542 | 9/1971 | |
| JP | 60-131357 | 7/1985 | |
| WO | WO 8703850 A1 * | 7/1987 | ........... B60T 11/26 |

\* cited by examiner

Primary Examiner—Edward K. Look
Assistant Examiner—Igor Kershteyn
(74) Attorney, Agent, or Firm—Ladas & Parry LLP

(57) ABSTRACT

A hydraulic pump for vehicles controllable by handlebars, having an unusually small space requirement, including a reservoir suitable for containing a working fluid having a free surface at the top, a pump body provided with a wall which delimits a cavity, and also freely conveying the fluid from the reservoir to the cavity of the pump body through an opening provided in the wall of the pump body. The opening is provided in a portion of the wall of the pump body at a distance from the top thereof, so that, during the operation of the pump, the free surface of the fluid contained in the reservoir is able to fall below the top without the fluid exposing the opening.

21 Claims, 10 Drawing Sheets

HYDRAULIC PUMP FOR VEHICLES CONTROLLABLE BY HANDLEBARS

The present invention relates to an hydraulic pump for brakes or clutches of motor vehicles or, more generally, for vehicles controllable by handlebars and, in particular, a pump comprising a reservoir and a pump body.

Hydraulic pumps of the type described above and currently on the market are constituted basically by a pump body which accommodates a piston capable of acting on a working fluid, and a reservoir for the fluid, which reservoir communicates with the pump body. Usually both the pump body and the reservoir are mounted on the handlebars of a motor vehicle in such a manner that a control lever, capable of acting on a piston, is arranged facing a handlebar grip.

The reservoir can be constructed integrally with the pump body or separately therefrom and connected thereto by means of a pipe. In any case, the pump body has an opening, formed in its wall, which permits the passage of fluid from the reservoir to the inside of the pump body.

In particular, the known pump body has an internal cavity closed by a wall provided with an opening arranged on the top, or the portion facing a plane defined by the free surface of the fluid which fills the reservoir to maximum capacity. This opening is suitable for receiving the fluid which falls by gravity, or freely, from an outlet of the reservoir.

As is known, the working fluid of the reservoir, where, for example, it is used for a braking system, acts principally as a reserve in order to permit the piston the further travel necessary to compensate for the wear of the friction material of the pads.

When these known pumps are installed on a motor vehicle, problems of space requirement and/or of aesthetics must also be faced.

Space requirement problems result principally from the fact that motor vehicles are provided with bodywork elements, such as hoods, windscreens, handguards, fairings or other similar components, which extend up to the vicinity of the ends of the handlebars where the grips and the pump bodies are positioned. Thus, it is necessary to seek suitable forms for the bodywork elements in order to obtain space for accommodating the reservoirs for the working fluid.

In particular, because the reservoirs are positioned above the pump bodies and often also above the handlebars, in order to envelop the handlebars completely with the bodywork elements, protuberances are required which are unaesthetic, especially in motorcycles having a compact and streamlined design.

The technical problem underlying this invention is to provide a pump for motorcycle applications which is designed structurally and functionally to avoid the disadvantages explained above with reference to the prior art.

The characteristics and advantages of the present invention will become clear from the following description of its preferred embodiments which are given by way of non-limiting indication, with reference to the appended drawings in which:

FIG. 3b is a cross-sectional view of the pump of FIG. 3a;

FIG. 5b is an axonometric view of a detail of the pump of FIG. 5a;

Figure 1A:
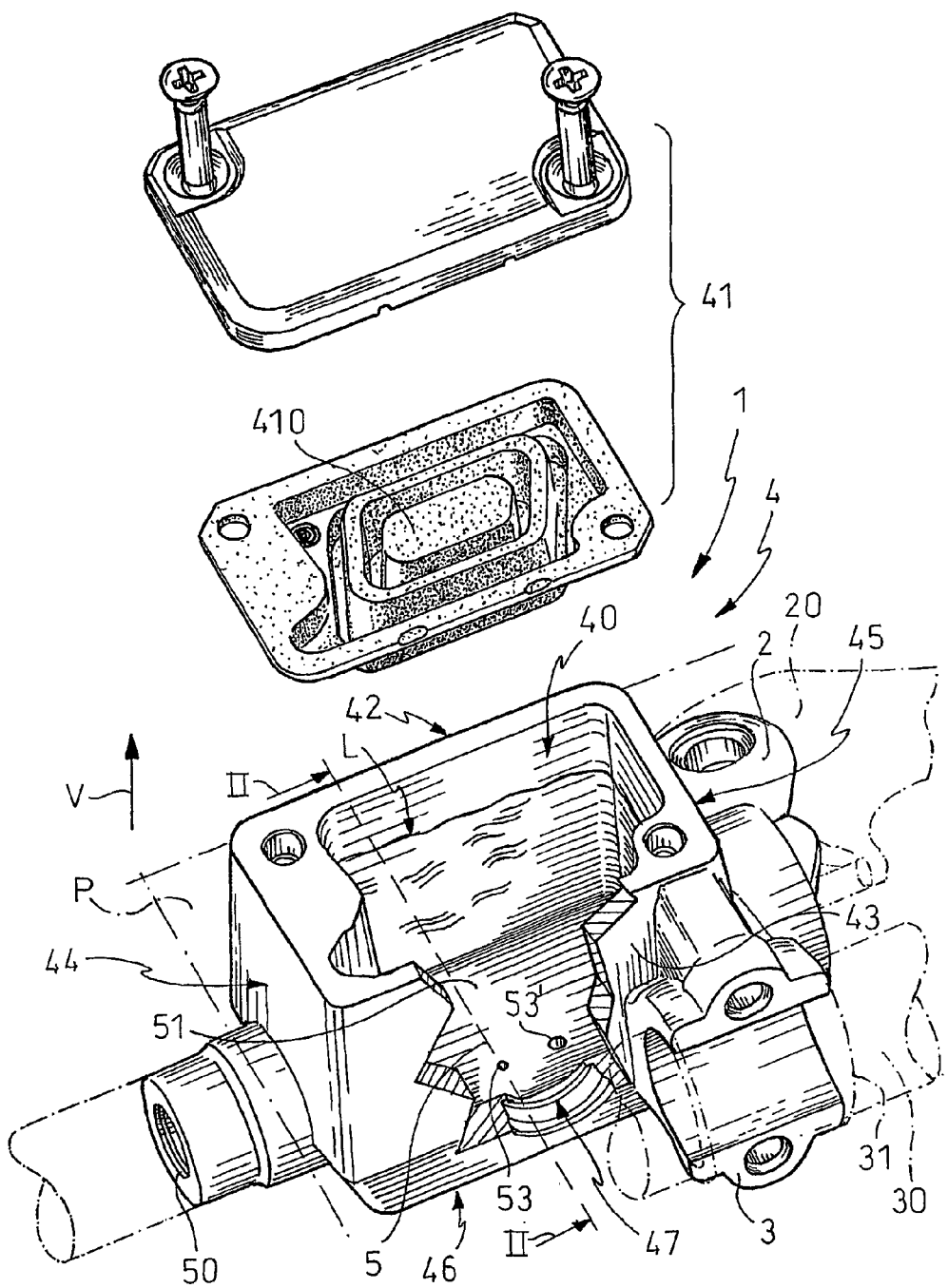
FIG. 1a is a partially sectional exploded axonometric view of a pump according to a first embodiment.

In the following description, the expression "working fluid" is to be understood as meaning any type of fluid suitable for use in braking systems or in clutch systems, for example for applications in vehicles controllable by handlebars.

The above-mentioned fluid is usually contained in a reservoir closed at the top by a cover. A flexible diaphragm to which the fluid adheres is also associated with the cover. Thus, the fluid never comes into direct contact with the outside environment.

The free surface of the fluid represents the fluid surface which is in contact with the above-mentioned diaphragm.

It will be appreciated that the free surface of the fluid is on a horizontal plane because it is subject to the action of gravity. Consequently, in order to avoid a probable escape of fluid from the reservoir and to use the maximum capacity thereof, the reservoir is mounted on the handlebars of a motor vehicle in such a manner that its walls are substantially at right-angles to the horizontal plane of the free surface. Therefore, when the fluid is contained in the reservoir under operating conditions, the reservoir is arranged with one of its openings directed upwards, defining a vertical direction V.

Referring to the drawings, a pump comprising a fork or lever lugs 2, a handlebar seat 3, a reservoir 4 and a pump body 5 is generally and diagrammatically indicated 1.

The lever lugs 2 support in an articulated and widely known manner a control lever 20, such as, for example, a control lever for a brake.

According to one embodiment, the handlebar seat 3 is formed integrally with the reservoir 4 in such a manner that it projects from one of the walls thereof, as described hereinafter. The handlebar seat 3 is shaped in such a manner as to accommodate a portion of a set of handlebars 30. For example, the seat is shaped semi-cylindrically in order to accommodate a tubular portion of a set of handlebars 30. A cap 31 known per se which connects the pump 1 securely to the handlebars 30 can be associated with the seat.

In FIG. 1, the reservoir 4 is substantially in the form of a parallelepiped provided with an opening 40 at the top which is reversibly closed by a cover 41, two larger lateral walls 42 and 43, a front wall 44, a rear wall 45 opposite the front wall, and a base 46, or base wall, opposite the opening 40. The cover 41 can be associated with an entirely conventional compensating diaphragm 410 which is in contact with the free surface L of the working fluid contained in the reservoir, represented in the drawings with a fluid level substantially at the maximum capacity of the reservoir. The level L of the fluid at the maximum capacity of the reservoir defines a plane P arranged horizontally. The handlebar seat 3 described above projects from the larger lateral wall 43 and in the vicinity of the rear wall 45, while an orifice 47 closed by a window (not shown) for observing the level of the working fluid contained in the reservoir 4 is provided in the vicinity of the front wall 44.

For example, the orifice 47 is provided in the wall facing the handlebars and thus the driver of the vehicle (FIG. 1a).

The pump body 5 is substantially cylindrical and, according to one embodiment, is formed integrally with the base 46 of the reservoir 4. The pump body 5, according to one embodiment, extends longitudinally and substantially parallel with the plane P. The pump body 5 is also provided with an outlet 50 projecting from the front wall 44.

Figure 2A:
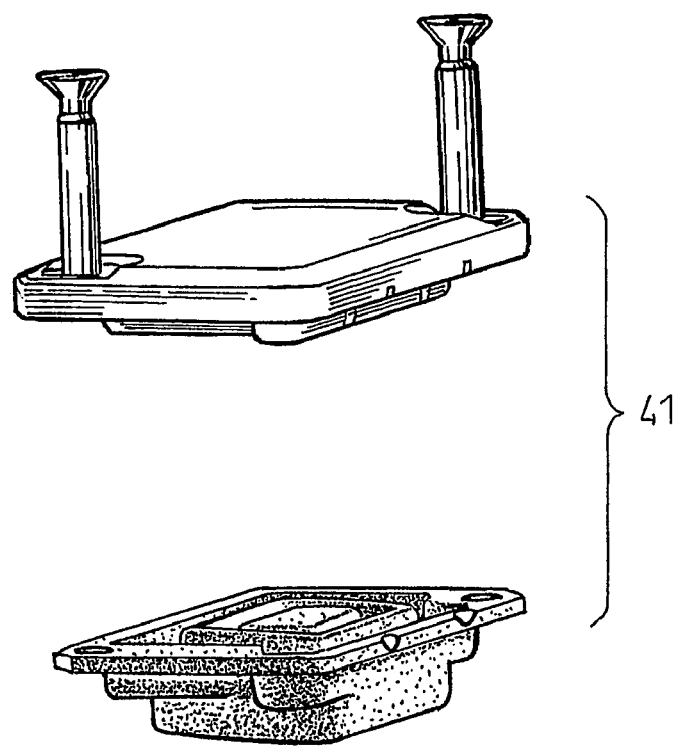
FIG. 2a is an exploded axonometric cross-section through the pump of FIG. 1a taken on the line II—II.
Figure 2A:
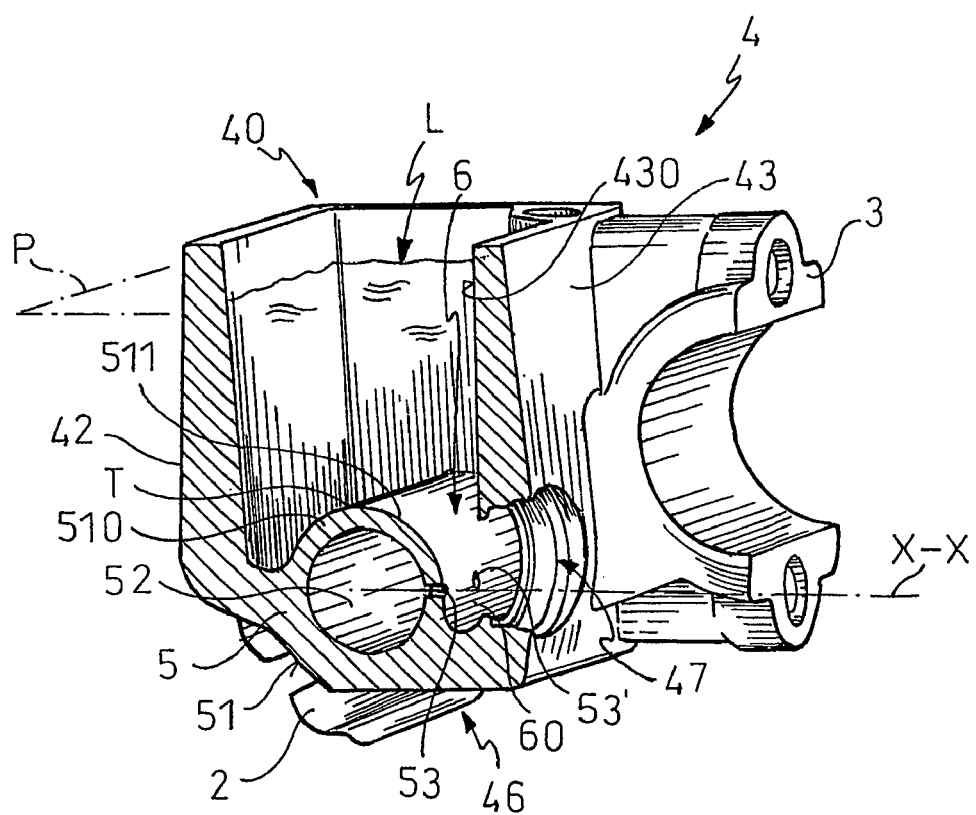
Figure 2B:
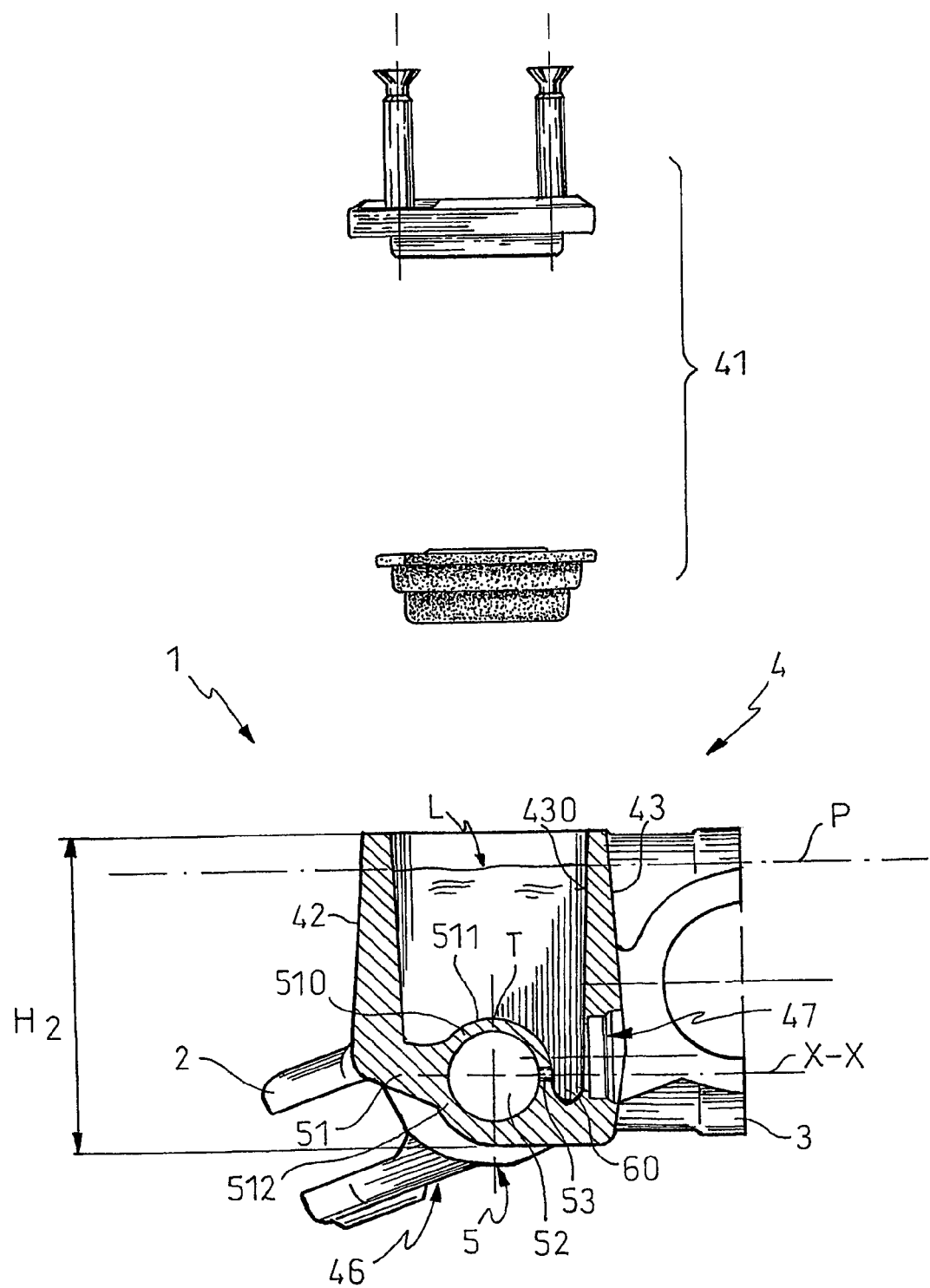
FIG. 2b is a cross-sectional view of the pump of FIG. 1a taken on the line II—II.

Referring to the cross-section of FIGS. 2a and 2b, the pump body 5 has a wall 51 of substantially circular cross-section delimiting an internal cavity 52 enabling a floating piston (not shown) to be mounted in a sliding and leaktight or sealing manner.

In addition, the wall 51 of the pump body 5 is provided with a top T or, in other words, with an upper end or, again in other words, an end facing the plane P.

Advantageously, the wall 51 is provided with an opening 53 formed in a portion of the wall 51 which extends away from the top T. The opening 53 opens out on the side facing the outlet or in front of a main front seal of the floating piston.

According to one embodiment, the opening 53 is flanked at the same level by a compensating through-hole 53' which opens out behind the floating piston. The compensating hole 53' is necessary for the passage of fluid from the reservoir to the cavity of the pump body while the system is being filled. In other words, the opening 53 permits the passage of fluid forwardly relative to the piston of the pump, for example, in order to add to the circuit the fluid necessary for compensating for the wear of the friction material of the pads, while the compensating hole enables the fluid to move easily and rapidly into the pipes of the hydraulic circuit when the system is being filled. Therefore, the opening 53 and the compensating hole 53' are always arranged at the same level on the wall of the pump body.

Preferably, the opening 53 is provided in a portion of the wall 51 of the pump body 5 between 3 o'clock and 9 o'clock, referring to a clock dial which can be associated with a cross-section of the pump body 5. More preferably, the opening 53 is provided at the point on the above-mentioned clock dial defined by 3 o'clock. In other words, a semi-axis X—X which extends outside the pump body 5 perpendicularly to its wall 51 can be associated with the opening 53. According to one embodiment, the semi-axis X—X represented in FIG. 2a is parallel with the plane P of the maximum level of the free surface L.

From the above description it will now be clear that, according to the embodiments explained above, the wall 51 of the pump body 5 can be subdivided into a first portion 510 which extends towards the inside and a second portion 512 which extends towards the outside of the reservoir 4.

The hydraulic pump 1 according to the present invention also comprises conveying means 6 which enable the working fluid to pass from the reservoir 4 to the pump body 5 through the opening 53 and the compensating hole 53'.

In particular, the conveying means 6 are defined by a cavity 60 which, for example, also extends below the opening 53. According to one embodiment, the cavity 60 is delimited by an internal surface 430 of the lateral wall 43 of the reservoir 4, by a surface portion 511 of the pump body 5, which surface portion 511 faces the internal surface 430, and by the surface of the base 46 of the reservoir 4, which surface faces the plane P.

The advantage obtained by using an hydraulic pump 1 as just described is that it is possible to reduce the dimensions of the reservoir 4 because the arrangement of the opening 53 away from the top T of the reservoir 4 enables the height H of the larger lateral walls 42 and 43 to be reduced while leaving unaltered the amount of fluid required for the safe functioning of the device.

In particular, the reservoir 4 can be reduced in height by a maximum amount corresponding to the diameter of the cross-section of the pump body 5 plus a thickness of the wall 51 of the pump body so that, during the operation of the pump, the free surface of the fluid contained in the reservoir is able to fall below the top of the pump body without the fluid exposing the opening.

It therefore follows that, owing to the solution proposed, the space requirement of the reservoir is substantially reduced with the result that it is possible to manufacture the various components of a motor vehicle more easily and economically by avoiding the provision of bulky housings for the reservoir in the bodywork elements. Consequently, the aesthetics of a motor vehicle can also be improved. It should be noted that this advantage, while being particularly evident when the opening 53 and the compensating hole 53' are arranged from 3 o'clock to 9 o'clock on the above-mentioned clock dial, is nevertheless appreciated when the opening 53 and the compensating hole 53' are provided in respective positions on a portion of the pump body removed to any extent from its top T, for example arranged from 1 o'clock to 11 o'clock of the clock dial or, advantageously, from 2 o'clock to 10 o'clock.

It should also be noted that, in addition to permitting the fitting of the above-mentioned window, the orifice 47 also advantageously permits the insertion of a tool for forming the opening 53 in the wall 51 of the pump body 5 before the fitting of the window.

Figure 1B:
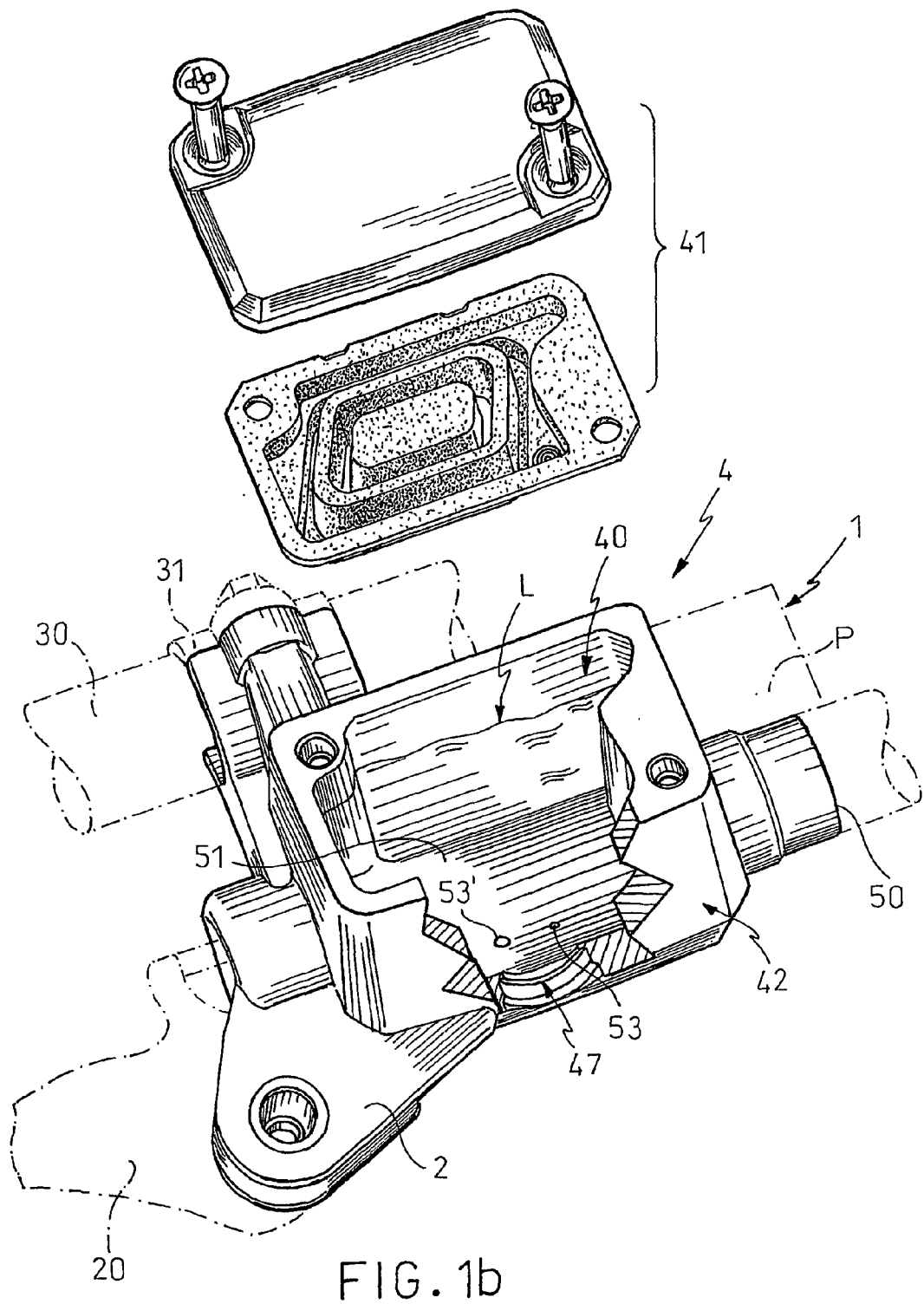
FIG. 1b is a partially sectional exploded axonometric view of a pump according to a further embodiment, viewed from the side opposite that facing the handlebars or the driver.

According to a further embodiment, the above-mentioned opening equipped with a window is provided in the wall opposite the handlebars and the driver. This embodiment enables the level of the fluid contained in the reservoir to be monitored even when the reservoir is arranged near the pump body or directly beside it and partially hidden by the handlebars (FIG. 1b).

According to a further aspect of the present invention, the conveying means 6 just described convey the working fluid from the reservoir 4 to the pump body 5 along a U-shaped fluid path.

The working fluid descends by simple gravity from the free surface L towards the base 46 of the reservoir 4 in order then to re-ascend inside the pump body 5, passing through the opening 53.

In other words, the path described above forms a siphon.

It follows from this that the hydraulic pump according to the invention, in addition to enabling the height of the reservoir to be reduced, can also allow the free surface of the fluid to fall to a level which is lower than that of the fluid in the pump body, preventing the ingress of air into the pump body as long as the level of the opening 53 in the pump body is not reached.

In the case of a braking system, it is well known that the ingress of air would bring about an extremely dangerous loss of efficiency in the entire braking system and would also make it impossible to brake the vehicle.

In order to prevent the ingress of air into the pump body, the free surface of the working fluid in the reservoir must always be higher than the opening 53 in the pump body.

If, however, the height of the reservoir is left unaltered, owing to the proposed solution, the level of safety of the working fluid against the accidental ingress of air into a braking system or into a clutch system is substantially increased.

A further advantage afforded by the invention results from the fact that the opening 53 is arranged in narrow spaces, such as those formed by the cavity 60 and, thus, any air-emulsified fluid present in the reservoir is prevented from reaching the vicinity of the opening 53, thus eliminating the possibility of air bubbles entering the pump body.

Figure 3A:
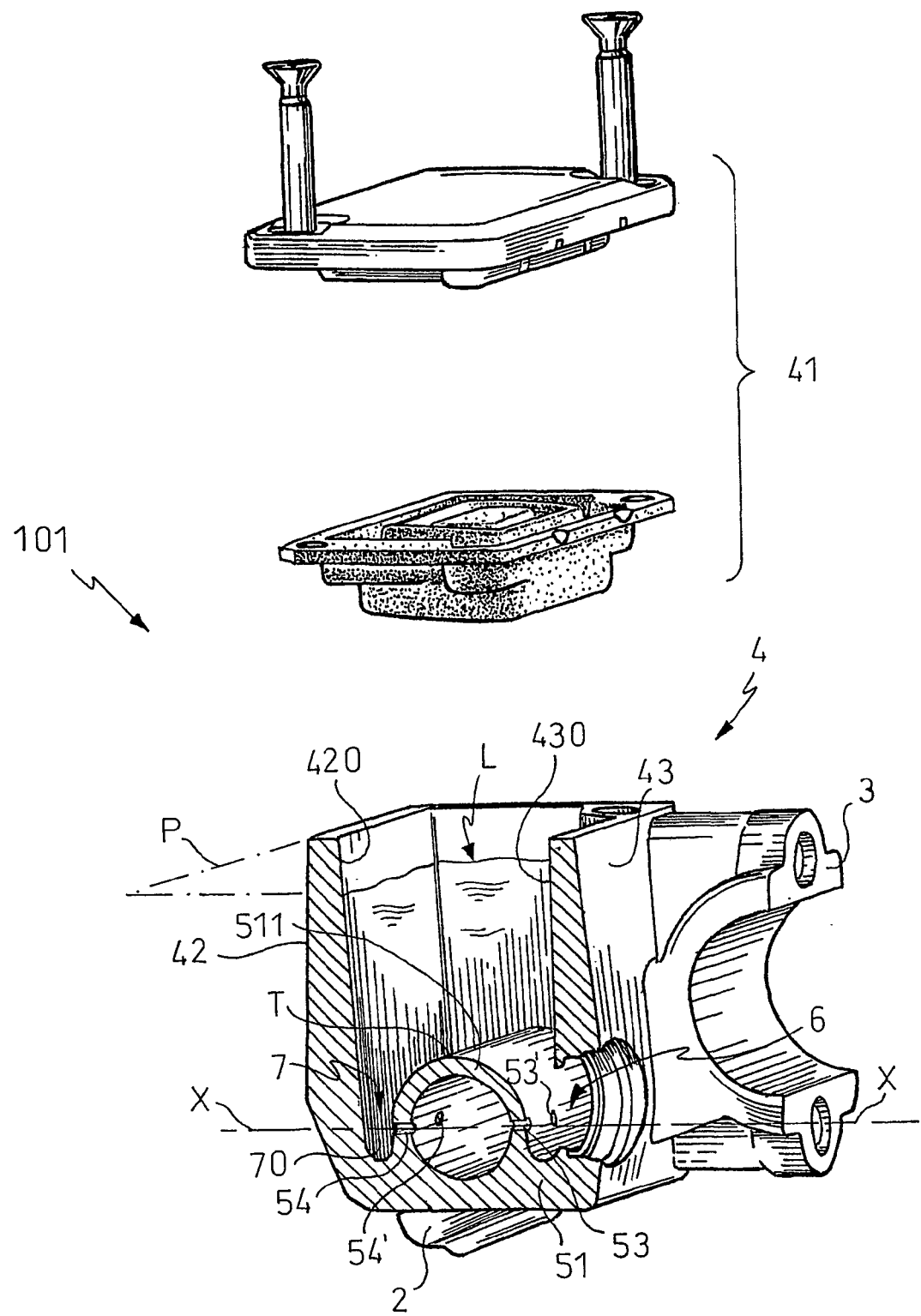
FIG. 3a is an exploded axonometric cross-section through a pump according to yet another embodiment.
Figure 3B:
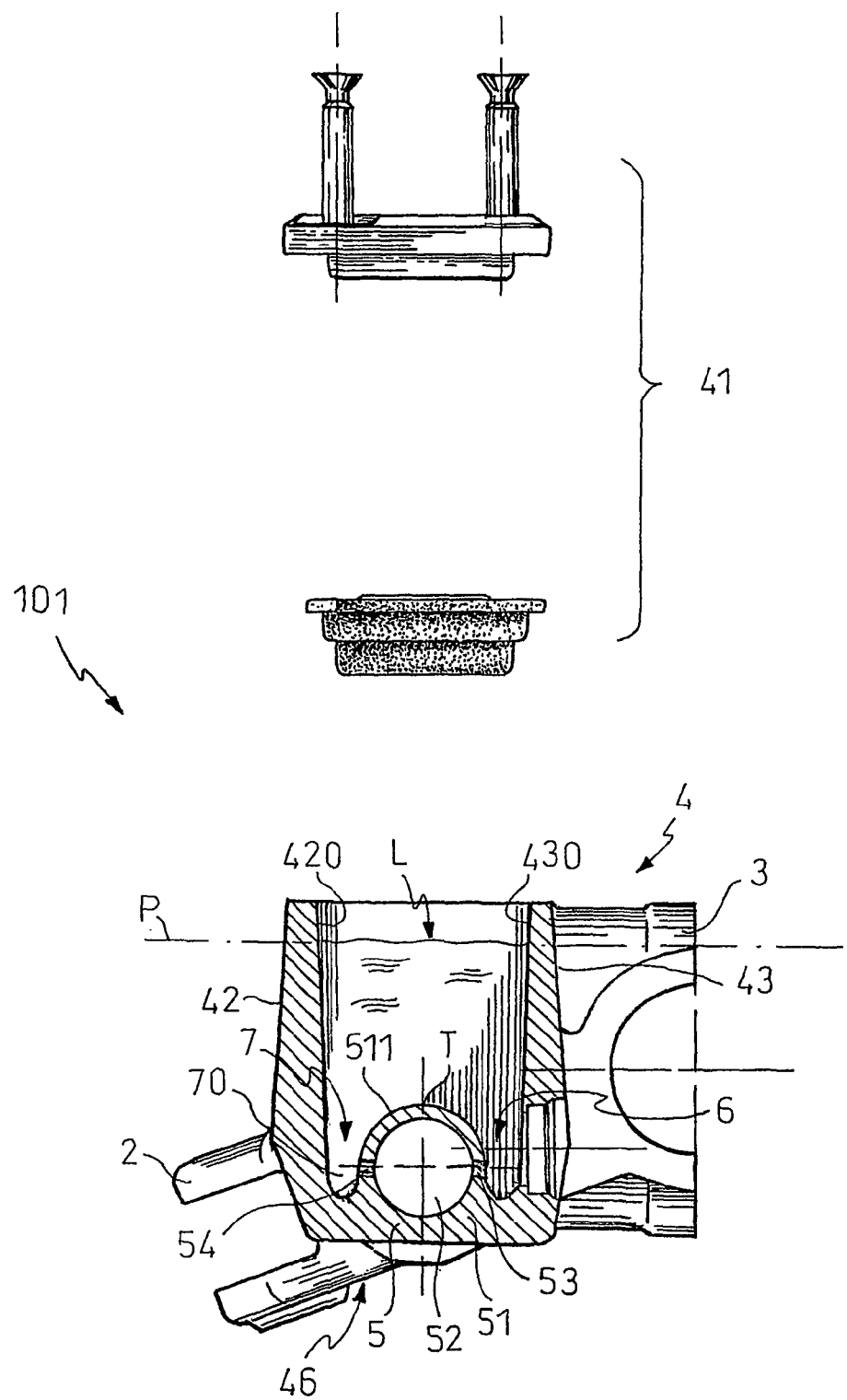

FIGS. 3a and 3b show a variant of the present invention.

The parts in common with the pump 1 described above are indicated with the same reference numerals and will not be described hereinafter.

In particular, the pump 101 has a pump body 5 manufactured integrally with the base 46 of the reservoir 4 in such a manner that it is substantially surrounded by the reservoir. It follows that substantially all of the wall 51 of the pump body 5 is arranged substantially inside the reservoir 4. Thus, the wall 51 may be provided with a further opening 54 opposite the opening 53.

According to one embodiment, the openings 53 and 54 are at 3 o'clock and 9 o'clock, respectively, with reference to the clock dial identified above.

It should also be noted that other conveying means 7 are provided also for the opening 54, the conveying means 7 defining a cavity 70 which is entirely the same as and reflective relative to that described above.

In addition, the cavity 70 is structurally similar to the cavity 60 so that it likewise operates in the manner of a siphon.

A further advantage afforded by this variant of the invention resides in the fact that the entry of fluid from the reservoir 4 into the pump body 5 becomes more rapid and consequently the braking action is also more rapid.

Figure 4:
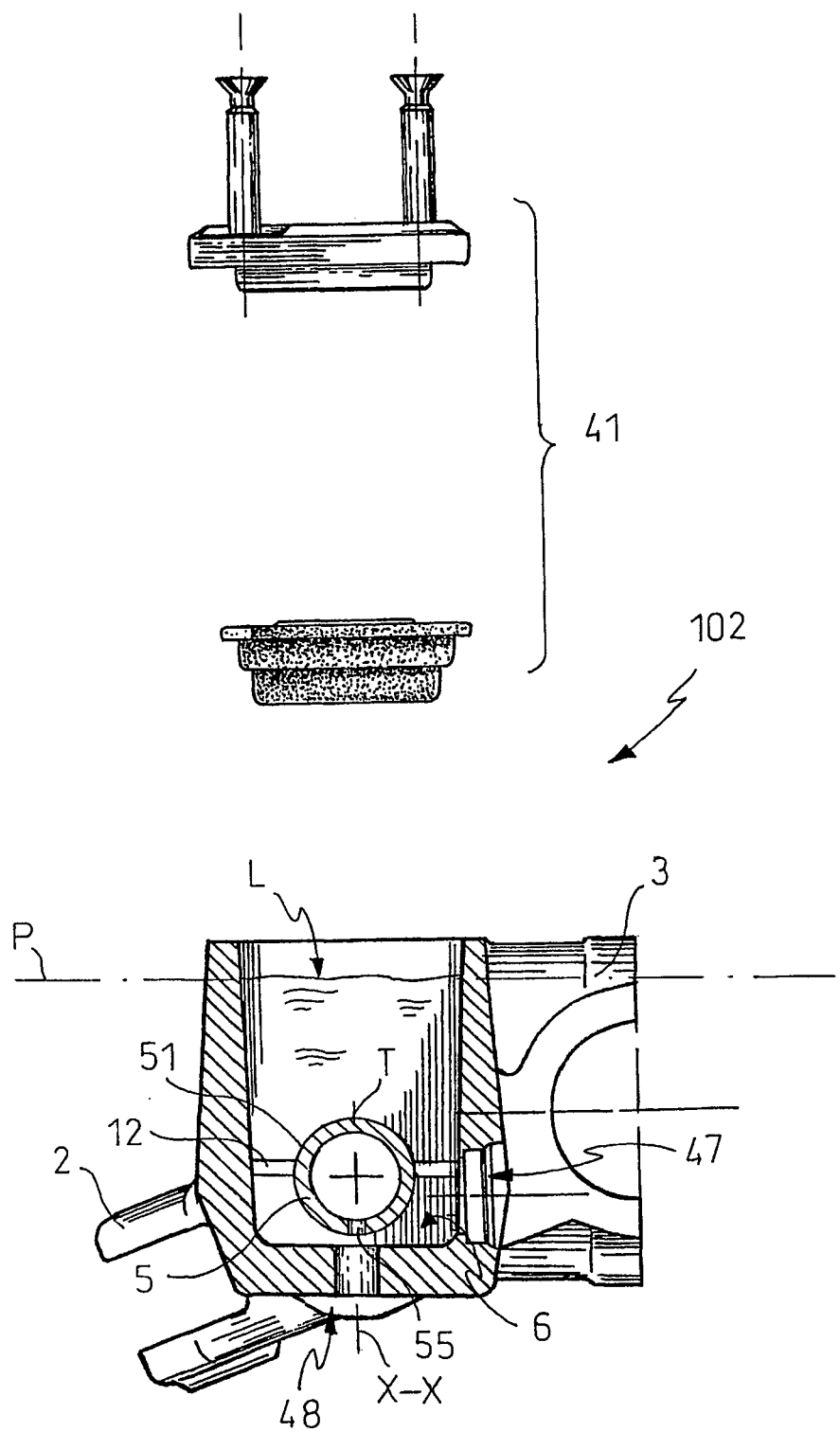
FIG. 4 is a cross-sectional view of a pump according to a fourth embodiment.

FIG. 4 represents a further variant in which the pump body 5 of a pump 102 is completely surrounded by the reservoir 4.

In particular, the pump body 5 is suspended inside the reservoir 4 near the base 46 by means of support members 12. The support members 12 are preferably represented by ribs or cross-members which join the lateral walls 42 and 43 to the wall 51 of the pump body 5.

Advantageously, the wall 51 of the pump body 5 has an opening 55 provided at 6 o'clock relative to the above-mentioned clock dial, enabling the space requirement of the reservoir 4 to be reduced still further. In other words, a semi-axis X—X which extends outside the pump body 5 perpendicularly to the plane P of the maximum level of the free surface L can be associated with the opening 55.

Preferably, the base 46 of the reservoir 4 is substantially flat, parallel with the plane P and provided with a further orifice 48 which is closed in a leaktight manner by a plug (not shown). The orifice is formed at the location of the opening 55 and has the function of enabling a tool to enter to form the opening 55 in the pump body 5.

As described above, the wall 43 of the reservoir 4 of the pump 102 is also provided with an orifice 47 analogous to that represented in FIGS. 2a, 2b and 3a, 3b, which enables a window to be fitted so that the levels of the working fluid can be observed.

Figure 5A:
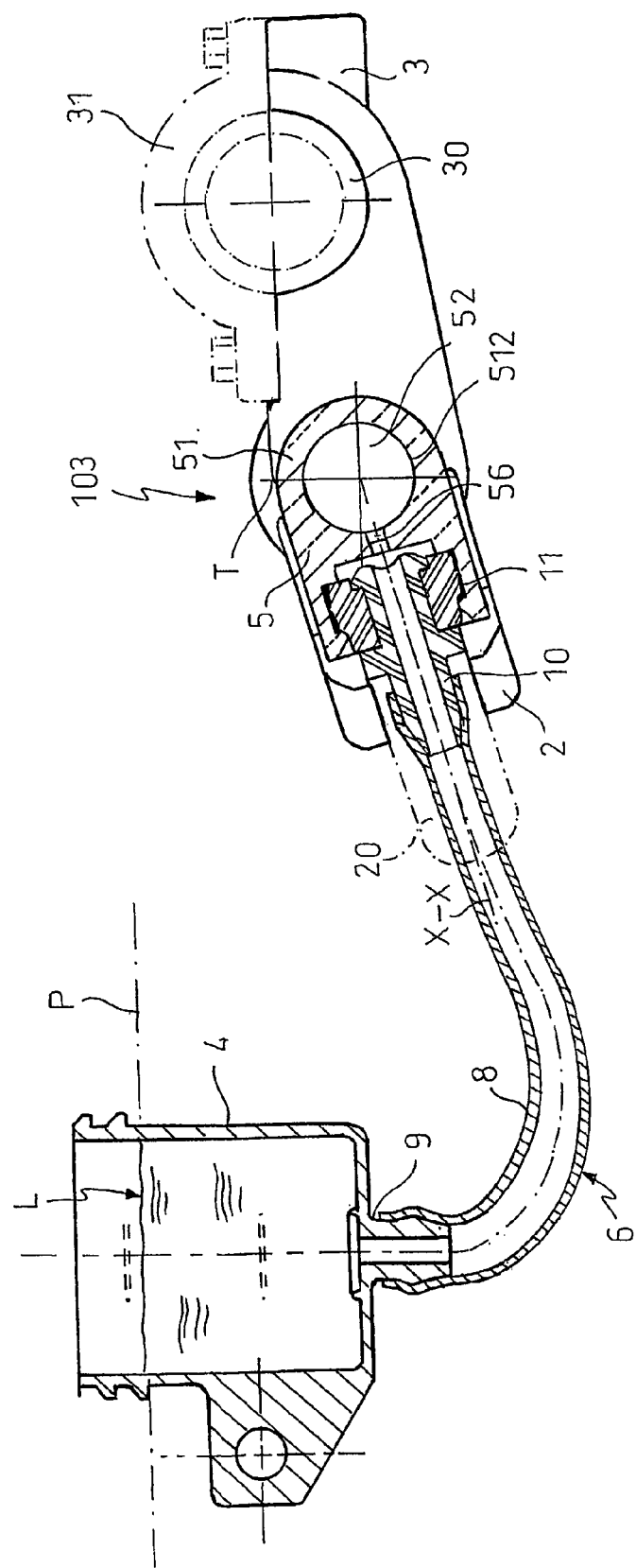
FIG. 5a is a cross-sectional view of a pump according to a fifth embodiment of the invention.
Figure 5B:
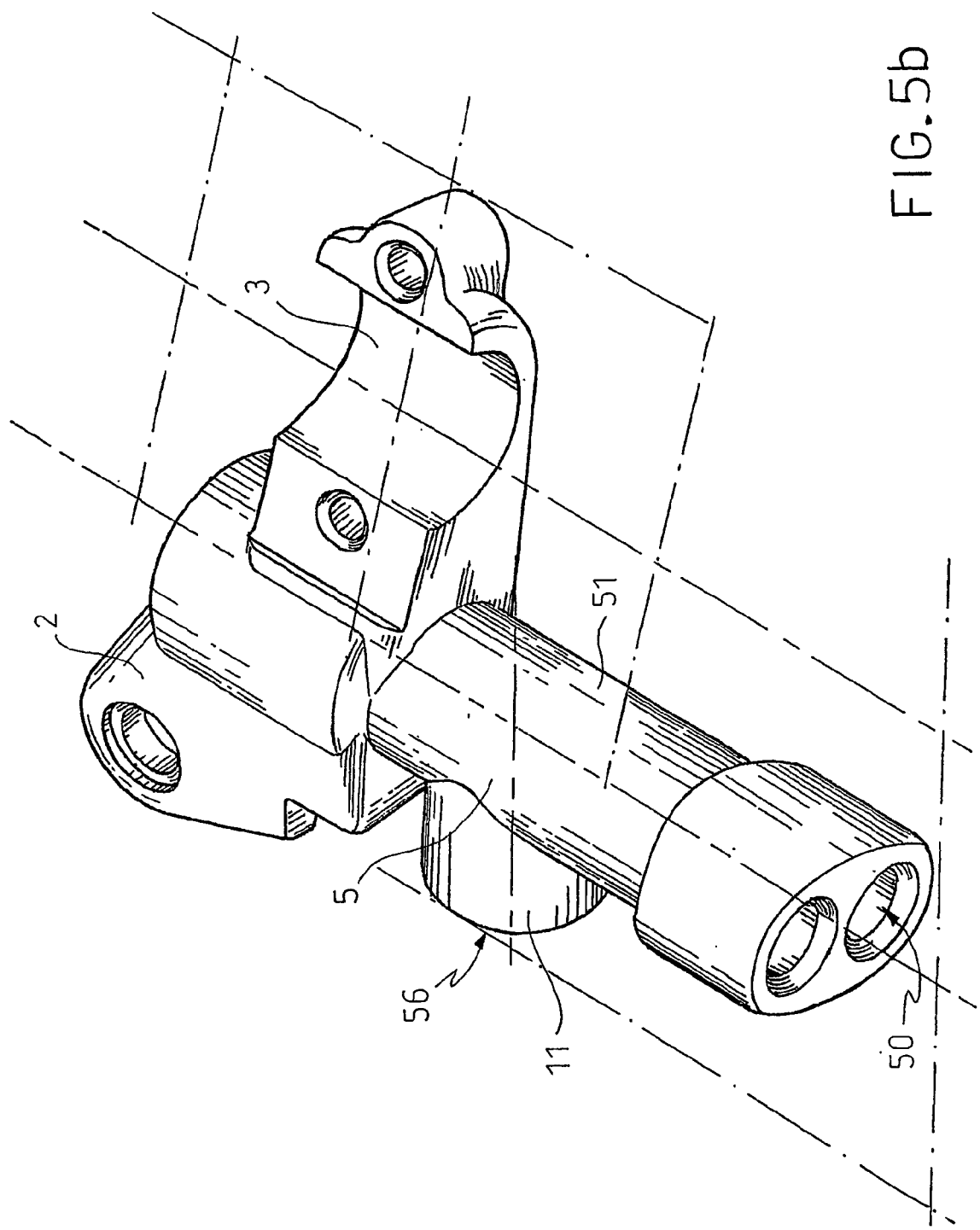
Figure 6:
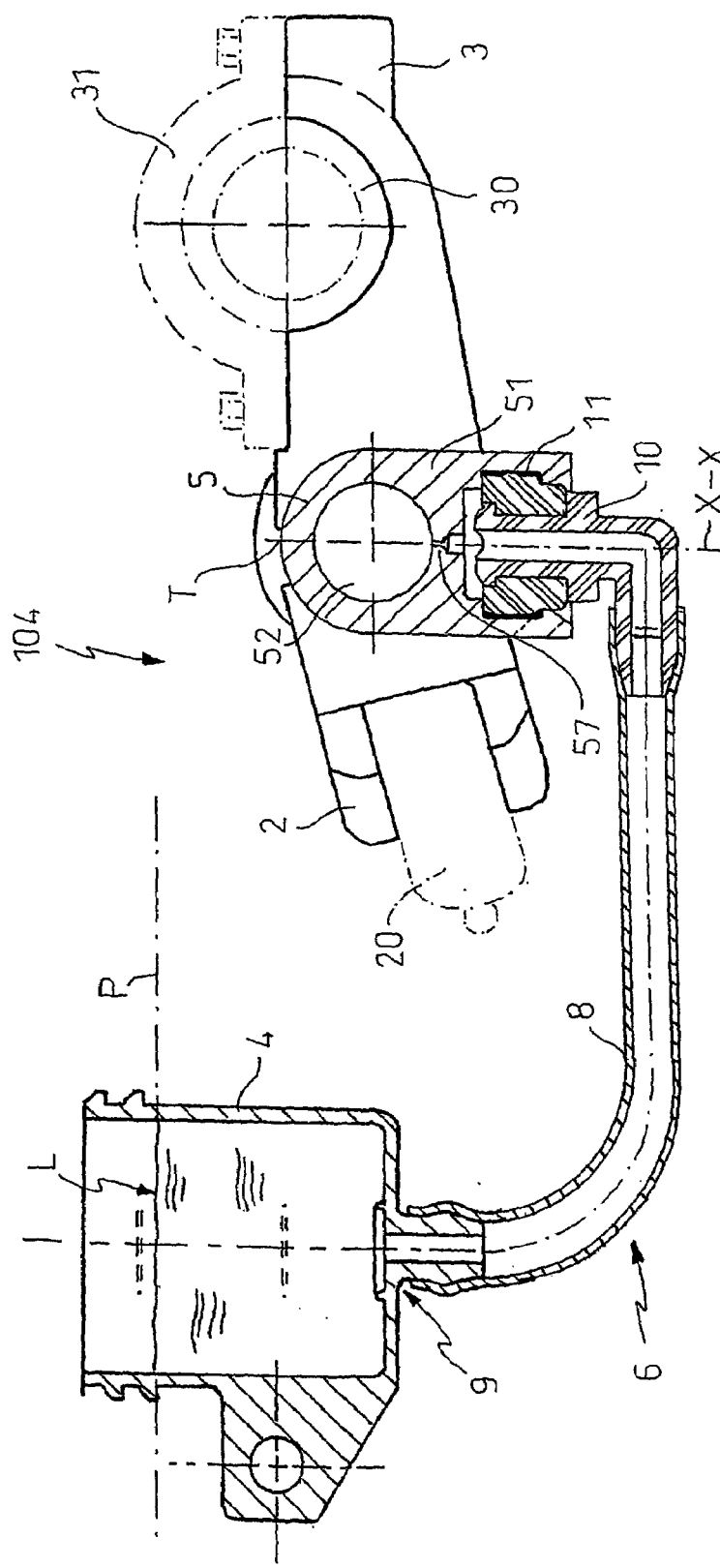
FIG. 6 is a cross-sectional view of a pump according to a sixth embodiment of the invention.

Referring to FIGS. 5a, 5b and 6, a description will now be given of two variants of the present invention in which the reservoir for containing the working fluid is manufactured separately from the pump body. In those Figures also, the parts in common with the previous embodiments are indicated with the same reference numerals and will not be described further.

As will be appreciated, in the hydraulic pumps 103 and 104, the pump bodies 5 are positioned at least partially below the plane P defined by the free surface L of the working fluid under conditions of maximum filling of the reservoir. The pump bodies are connected to the respective reservoirs 4 by conveying means 6 represented diagrammatically in FIGS. 5a and 6.

According to one embodiment, analogously to the situation described for the previous embodiments, the opening 56 is provided in a portion of the wall 51 of the pump body 5 between 3 o'clock and 9 o'clock of a clock which can be associated with a cross-section of the pump body 5. Preferably, as represented in FIG. 5a, the opening is located at that point on the wall which is defined by 8 o'clock.

In other words, a semi-axis X—X extending outside the pump body 5 away from the plane P of the maximum level of the free surface L can be associated with the opening 56.

The conveying means 6 comprise a pipe 8 having one end 9 coupled to an outlet provided in the base 46 of the reservoir 4 and one end 10 coupled to a connector 11. The connector 11 is in turn coupled to the pump body 5 at the opening 55, being accommodated, for example, in a seat provided in the pump body 5.

According to one embodiment, this connector is a connector of the engaging type.

As clearly shown in FIG. 5a, the pipe 8 conveys the working fluid along a U-shaped fluid path. In other words, this path forms a siphon.

In FIG. 6, the hydraulic pump 104 differs from the hydraulic pump 103 of FIGS. 5a and 5b in the position of the opening 57 in the pump body 5.

The opening 57 is provided at that point on the wall 51 of the pump body 5 which is defined by 6 o'clock. In other words, a semi-axis X—X which extends outside the pump body 5 perpendicularly to the plane P and away therefrom can be associated with the opening 57. As described for the embodiment of FIG. 5a, the pump 104 comprises conveying means 6 which are entirely analogous to those described above and will therefore not be exemplified further.

It will be clear from the above presentation that the hydraulic pump in vehicles controllable by handlebars according to the present invention enables the problems described with reference to the prior art to be solved.

In particular, the reduction in space requirement afforded by the technical solution according to the invention also affords some ease of integration of a pump into a motor vehicle, at the same time improving the aesthetics thereof.

Furthermore, with reference to pump bodies manufactured integrally with reservoirs, the present invention enables better use to be made of the working fluid available by allowing the quantity of fluid between the top of the pump body and the base of the reservoir to be used, unlike the situation with the pumps according to the prior art.

Last but not least, because the opening in the pump body is near narrow regions, the risk of emulsified fluid reaching the vicinity of the opening is eliminated. Among other things, this means that the hydraulic pump according to the present invention permits the elimination of any appendages of the compensating diaphragm which are necessary in the pumps of the prior art to prevent the emulsified fluid from moving to the vicinity of the opening.

It should be underlined that the embodiment described above with reference to FIG. 4 enables the above-mentioned reduction in the space requirement and, at the same time, the siphon effect to be optimised because the opening 55 is on the opposite surface of the pump body 5 to the plane P defined by the free surface L and in close proximity to the base 46 of the reservoir 4. The reservoir 4 could even be reduced to a gap surrounding the pump body 5 and enabling the free surface L to fall well below the top T of the pump body 5. At the same time, the siphon effect is greatly increased compared with the solutions represented in FIGS. 2a, 2b and 3a, 3b.

It will be appreciated that, in order to satisfy contingent and specific requirements, a person skilled in the art could introduce numerous modifications and variants to the hydraulic pump described above which would all, however, be contained within the scope of the invention as defined by the following claims.

What is claimed is:

1. A hydraulic pump for vehicles controllable by handlebars, comprising a reservoir provided with a frontal wall, said reservoir being suitable for containing a working fluid, said fluid having a free surface at the top of the fluid, a pump body manufactured in a single piece with the reservoir and provided with a wall, said wall being of substantially circular cross-section having a top and delimiting a cavity enabling a floating piston to be mounted therein in a sliding manner and means for freely conveying the fluid from the reservoir to the cavity of the pump body through an opening provided in the wall of the pump body, said opening being disposed at a distance from the top of the pump body, so that, during the operation of the pump, the free surface of the fluid contained in the reservoir is able to fall below the top of the pump body without the fluid exposing the opening the pump body being provided with an outlet projecting from said front wall of said reservoir, wherein said conveying means are defined by a cavity delimited by an internal surface of the lateral wall of the reservoir, by a surface portion of the pump body, which surface portion faces the internal surface of the lateral wall of the reservoir, and by a surface of a base of the reservoir, which surface faces towards a plane defined by a maximum level of the free surface of the fluid.

2. The hydraulic pump according to claim 1, wherein the pump body extends longitudinally.

3. The hydraulic pump according to claim 1 or 2, wherein the pump body extends parallel with the plane of the maximum level of the free surface.

4. The hydraulic pump according to claim 1, 2 or 3, wherein the opening is provided in a portion of the wall of the pump body between between 2 o'clock and 10 o'clock of a clock dial which can be associated with a cross-section of the pump body.

5. The hydraulic pump according to claim 1, 2, or 3, wherein the opening is provided in a portion of the wall of the pump body between 3 o'clock and 9 o'clock of a clock dial which can be associated with a cross-section of the pump body.

6. The hydraulic pump according to claim 5, wherein the opening is provided at that point on the wall of the pump body which is defined by 3 o'clock or 9 o'clock.

7. The hydraulic pump according to claim 4 or 5, comprising at least one further opening.

8. The hydraulic pump according to claim 7, wherein the further opening is provided at that point on the wall of the pump body which is defined by 11 or 1 or 10 or 2 or 9 or 3 o'clock.

9. The hydraulic pump according to claim 4 or 5, wherein the opening is provided at that point on the wall of the pump body which is defined by 8 o'clock.

10. The hydraulic pump according to claim 4 or 5, wherein the opening is provided at that point on the wall of the pump body which is defined by 6 o'clock.

11. The hydraulic pump according to any one of claims 1 to 10, wherein a semi-axis extending, outside the pump body perpendicularly to its wall can be associated with the opening.

12. The hydraulic pump according to claim 11, wherein the semi-axis of the opening is parallel with the plane of the maximum level of the free surface.

13. The hydraulic pump according to claim 11, wherein the semi-axis of the opening extends away from the plane.

14. The hydraulic pump according to claim 11, wherein the semi-axis of the opening is perpendicular to the plane.

15. The hydraulic pump according to claim 1, wherein a first portion of the pump body extends towards the inside and a second portion extends towards the outside of the reservoir.

16. The hydraulic pump according to claim 1, wherein substantially all of the wall of the pump body is surrounded by the reservoir.

17. The hydraulic pump according to claim 1, wherein the conveying means are defined by a cavity in the reservoir, which cavity extends below the opening.

18. The hydraulic pump according to claim 17, wherein each of the cavities is delimited by an internal surface of a lateral wall of the reservoir, by a surface portion of the pump body which faces the internal surface and by a surface of a base wall of the reservoir.

19. The hydraulic pump according to any one of claims 1 to 18, wherein the conveying means convey the working fluid from the reservoir to the pump body along a U-shaped fluid path.

20. The hydraulic pump according to any one of the preceding claims, wherein the conveying means form a siphon.

21. The hydraulic pump according to any one of the preceding claims, wherein at least one compensating hole flanked at the same level by the opening is provided.

* * * * *